United States Patent
Keates

(10) Patent No.: US 10,566,582 B2
(45) Date of Patent: Feb. 18, 2020

(54) BATTERY UTILIZING DEVICE CAVITY

(71) Applicant: INTEL CORPORATION, Santa Clara, CA (US)

(72) Inventor: Andrew W. Keates, Los Gatos, CA (US)

(73) Assignee: INTEL CORPORATION, Santa Clara, CA (US)

(*) Notice: Subject to any disclaimer, the term of this patent is extended or adjusted under 35 U.S.C. 154(b) by 725 days.

(21) Appl. No.: 15/190,622

(22) Filed: Jun. 23, 2016

(65) Prior Publication Data

US 2017/0373283 A1 Dec. 28, 2017

(51) Int. Cl.

| | | |
|---|---|---|
| *H01M 2/02* | (2006.01) | |
| *H01M 2/06* | (2006.01) | |
| *B43K 29/00* | (2006.01) | |
| *H01M 4/66* | (2006.01) | |
| *H01M 4/80* | (2006.01) | |
| *H01M 6/02* | (2006.01) | |

(52) U.S. Cl.
CPC ............ *H01M 2/022* (2013.01); *B43K 29/00* (2013.01); *H01M 2/026* (2013.01); *H01M 2/0285* (2013.01); *H01M 2/0287* (2013.01); *H01M 2/06* (2013.01); *H01M 4/661* (2013.01); *H01M 4/808* (2013.01); *H01M 6/02* (2013.01); *H01M 2220/30* (2013.01)

(58) Field of Classification Search
CPC .... H01M 2/022; H01M 2/026; H01M 2/0287; H01M 4/661; H01M 2/06; H01M 2/0285; H01M 4/808

See application file for complete search history.

(56) References Cited

U.S. PATENT DOCUMENTS

| 5,856,040 A | 1/1999 | Newman et al. | |
|---|---|---|---|
| 2005/0026037 A1* | 2/2005 | Riley, Jr. ................. | H01M 4/38 429/210 |
| 2006/0093909 A1 | 5/2006 | Zhang | |

(Continued)

FOREIGN PATENT DOCUMENTS

| KR | 200192947 Y1 | 8/2000 |
|---|---|---|
| KR | 100741320 B1 | 7/2007 |

OTHER PUBLICATIONS

PCT/US2017/034159, International Search Report and Written Opinion, dated Aug. 28, 2017, 19 pages.

*Primary Examiner* — Stewart A Fraser
(74) *Attorney, Agent, or Firm* — Stoel Rives LLP

(57) ABSTRACT

An electronic device, including a housing that is metal or lined with an electrically conductive material, at least one electrical component, and a battery cell positioned in a cavity in the outer housing, the battery cell integrated into the electronic device. The battery cell includes a first current collector and an active cell core. The first current collector is the electrically conductive material of the outer housing of the electronic device and connects to the at least one electrical component. The active cell core includes a first active material in adjacent facing relation to and electrically coupled to the first current collector, a second active material; a separator positioned between the first active material and the second active material; and a second current collector electrically coupled with the second active material, wherein the second current collector connects to the at least one electrical component.

25 Claims, 7 Drawing Sheets

(56) References Cited

U.S. PATENT DOCUMENTS

| | | |
|---|---|---|
| 2009/0126745 A1 | 5/2009 | Hon |
| 2016/0118681 A1* | 4/2016 | Park .................. H01M 10/0431 |
| | | 429/94 |
| 2016/0260999 A1* | 9/2016 | Park .................. H01M 10/0431 |
| 2016/0274682 A1* | 9/2016 | Yebka ................. G06F 3/03545 |

* cited by examiner

610 Copper foam

610 Copper foam

614 Second active material

BATTERY UTILIZING DEVICE CAVITY

TECHNICAL FIELD

This disclosure relates to portable energy sources such as batteries, and more particularly to a battery integrated into a cavity of an electronic device that has an electrical component that receives power from the battery.

BACKGROUND

Conventionally, for electronic devices, such as pens, that have an electrical component, standard shaped batteries are placed into the device to provide power to the electrical component. However, using standard shaped batteries often results in sub-optimal use of space in the electronic device and limited battery run-time.

For example, FIG. 1 illustrates an electronic pen 100 with a conventional battery. The pen 100 includes an electrical component (not shown) that receives power from coin-cell batteries 102. The coin-cell batteries 102 are placed into the pen 100 in a fashion which blocks the ink tube 104 of the pen 100 and shortens the ink refill tube 106. Since the ink refill tube 106 must be shortened to fit the coin-cell batteries 102, space is wasted in the pen 100 and not as much ink is provided for the user. Also, each of the coin-cell batteries 102 has a high packaging overhead, resulting in a low amount of energy being stored.

BRIEF DESCRIPTION OF THE DRAWINGS

Arrangements and embodiments may be described in detail with reference to the following drawings, in which like reference numerals refer to like elements, and wherein.

DETAILED DESCRIPTION OF EMBODIMENTS

Figure 1:
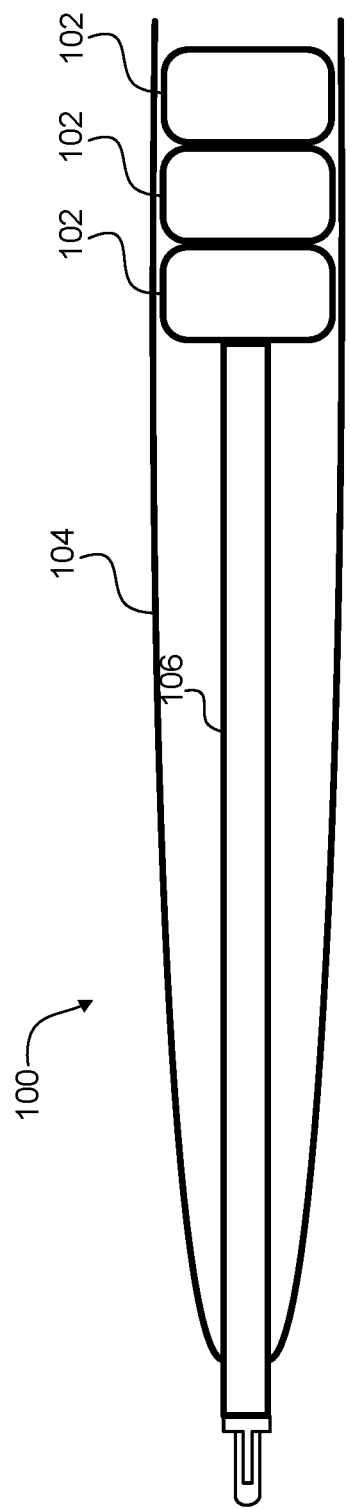
FIG. 1 is a cross-section view of a conventional pen with coin-cell batteries.

Embodiments and arrangements disclosed herein include an electronic device with a battery cell integrated into the device. In certain embodiments, an electrically conductive foam, such as a metallic foam, is configured as an anode current collector in the battery cell. As discussed below, some embodiments use cavities already located within devices to place a battery cell. Further, the battery cell may use a component of the electronic device, such as a housing, to act as a component of the battery cell. Some embodiments include integrating the battery cell into the device by planning a cavity within the device to place the battery cell.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of the disclosed embodiments. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

The disclosed technology utilizes cavities within electronic devices to form a battery of a desired size to better utilize the space within the electronic device. For example, the electronic device may be an electronic pen, hearing aid, or any other type of electronic device that has an electrical component that receives power from a battery. As discussed in more detail below, the cavity may already exist in the electronic device or may be formed into the electronic device. This allows for batteries to be placed more efficiently in electronic devices without compromising other components.

Figure 2:
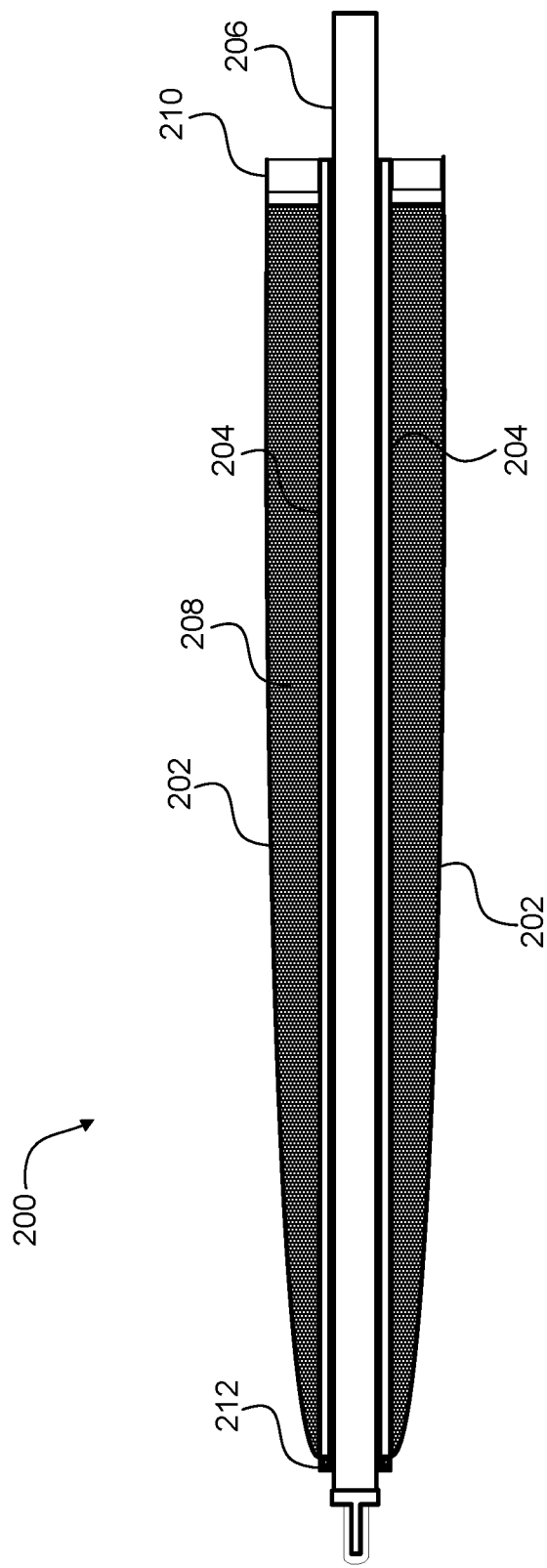
FIG. 2 is a cross-section view of an example pen with an integrated battery according to some embodiments of the disclosed technology.

FIG. 2 illustrates a cross-section of an electronic device comprising a pen 200 with a battery cell according to one embodiment. For ease of example, a pen 200 is shown as the electronic device. The pen 200 includes a metal outer housing 202, an ink conductive tube 206, and at least one electrical component 210. The electrical component 210 may be, for example, an LED, a processor, a display, etc. Although only a single electrical component is shown, multiple electrical components may be provided in the pen 200.

The electrical component 210 connects to a battery cell. The battery cell is provided in the cavity of the pen 200 that is formed by the metal outer housing 202 and the inner conductive tube 204. The battery cell is also integrated into the pen 200 by using the metal outer housing 202 as a component of the battery cell. For example, in one embodiment, the battery cell comprises a metal foam that is shaped and/or crushed so as to be inserted between the metal outer housing 202 and the inner conductive tube 204. In certain such embodiments, a high conductivity cathode material allows the metal foam to be relatively thick (e.g., greater than about 1 mm) and still facilitate the flow of ions and electrons through the volume between the central core of the battery cell and metal outer housing 202. The high conductivity cathode material may include, for example, lithium cobalt oxide, lithium nickel oxide, lithium manganese oxide, lithium iron phosphate, lithium titanium oxide a mixture of some of these chemistries, or different chemistries. Anode material may comprise graphite or other forms of carbon, lithium metal, a metal other than lithium (e.g., magnesium or tin), or any other suitable anode material. Example battery cells comprising metal foam as one current collector are discussed in more detail below. In this example, the anode material and separator are deposited into the metal foam before the pores are filled with cathode material, thereby completing the battery structure of the current collector (metal foam), anode, separator, cathode, and current connector (device cavity wall).

That is, the battery cell includes a first current collector, which is also the metal outer housing 202 of the pen 200, and an active cell core 208. The active cell core 208 includes a first active material, a second active material, a separator positioned between the first active material and the second active material, and a second current collector, which will be discussed in more detail below. The pen 200 may also include an inner conductive tube 204 that surrounds the ink refill tube 206 and insulation ring 212. The inner conductive tube 204 electrically acts as the second current collector for the active cell core 208. The insulation ring 212 insulates the outer metal housing 202 (for example, the positive terminal) from the inner conductive tube 204 (for example, the negative terminal). As seen in FIG. 2, the electrical component 210 connects to the battery cell through the metal outer housing 202 and the inner conductive tube 204, which is electrically connected to the second current collector in the active cell core 208. One of the metal outer housing 202 and the inner conductive tube 204 acts as a positive terminal of the battery cell and the other acts as a negative terminal of the battery cell. The electronic component 210 may be intimately integrated with the battery as show, or be located elsewhere, for example in an upper portion of pen 200. In other embodiments, the insulating ring 212 may be absent. In such a case, the outer metal housing 202 and the inner conductive tube 204 become the same terminal of the battery (positive or negative) and the second terminal may be ring 214 which is insulated from the outer metal housing 202 and the inner conductive tube 204, but connected to the end of the active core 208. In some embodiments, ring 214 may be paired with either the outer shell 202 or the inner tube, but not both, as in the prior embodiment example.

In certain embodiments, a conductive material (not shown) is also placed as an interface between the active cell core 208 and the metal outer housing 202, and/or between the active cell core 208 and the inner conductive tube 204. The conductive material helps allow the electrons from the active cell core 208 to be passed between the active cell core 208 to the metal outer housing 202 or the inner conductive tube 204. Any conductive medium compatible with the chemistry of the battery cell may be used, including, but not limited, to gels and adhesives.

Although a pen 200 is shown in the embodiment of FIG. 2, the disclosed technology is not limited to electronic pens. Any type of electronic device that has a cavity with a conductive layer that may be integrated into the battery cell may be used.

Figure 3:
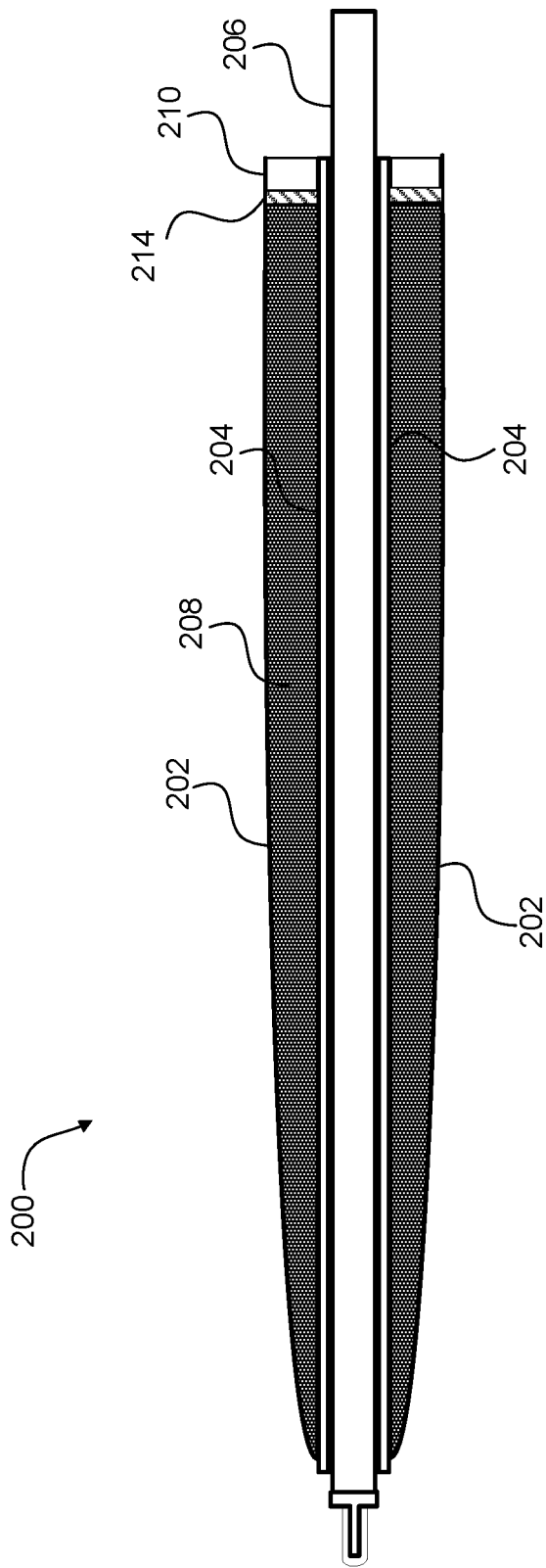
FIG. 3 is a cross-section view of another example pen with an integrated battery according to some embodiments of the disclosed technology.
Figure 4:
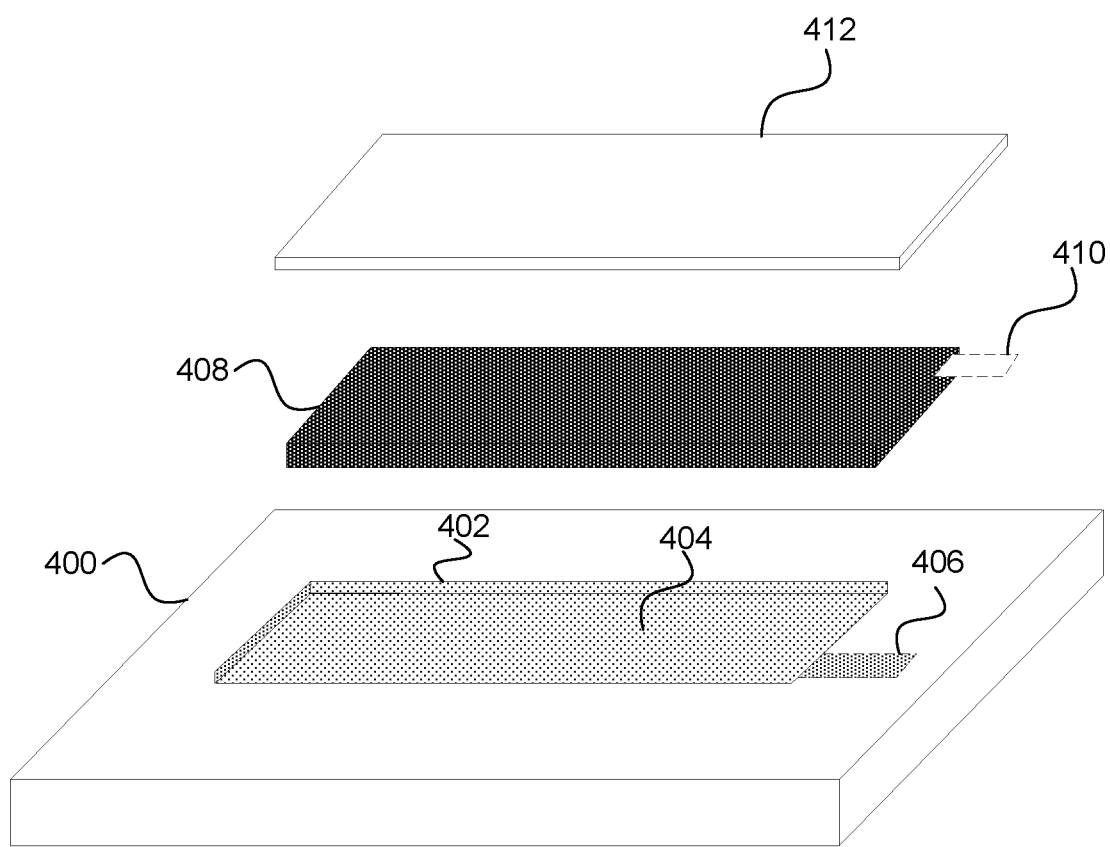
FIG. 4 is an exploded view of an electronic device according to some embodiments of the disclosed technology.

In some embodiments, cavities may be planned into electronic devices, as shown in FIG. 4, or the cavities may be formed by plastic housings, such as a pen with a plastic outer housing, rather than a metal housing as discussed with respect to FIG. 2. FIG. 4 illustrates an exploded view of an electronic device 400 with a cavity 402. The cavity 402 may already be formed in the electronic device by various components of the electronic device, such as the examples shown in FIGS. 2 and 3, or the cavity 402 may be deliberately created, such as in injection-molded plastic, to house the battery cell.

If the cavity 402 in the electronic device 400 does not include a metal layer, cavity 402 is lined with an electrically conductive material that acts as a first current collector 404. For example, if the metal outer housing 202 of the pen 200 is plastic, the outer housing may be lined with an electrically conductive material that acts as the first current collector 404. The first current collector 404 may extend outside of the cavity, as shown in FIG. 4, with a tab 406. The tab 406 acts as a battery terminal and connects to an electrical component (not shown). The first current collector 404 may be aluminum, copper, silver, gold, zinc, nickel, steel, or other non-metallic electrical conductors such as graphite or a conductive polymer. Any manner of conductive surface shall be considered as an option pertaining to the embodiments discussed herein.

An active core cell 408 is placed in the cavity 402 and may include a tab 410. Similar to the tab 406, the tab 410 may extend out of the cavity 402 to act as another electrical connection point (or battery terminal) for the electrical component. The active cell core 408 will be discussed in more detail below. The active cell core 408, however, may be similar to the active cell core 208 discussed above and includes a first active material, a second active material, a separator positioned between the first active material and the second active material, and a second current collector.

In certain embodiments, as illustrated in FIG. 4, the cavity 402 also includes a cover 412 to cover the battery cell in the cavity 402. The cover 412 may be a component of the battery cell or may be an insulating material to cover the battery cell. If the cover 412 is a component of the battery cell, the cover 412 may be electrically connected to either the first current collector 404 or the second current collector, discussed below, in the active cell core 408. If the cover 412 is electrically connected to the first current collector 404, the tab 406 need not be provided and the electronic component (not shown) connects to the cover 412 and the tab 410 as the battery terminals. Similarly, if the cover 412 is electrically connected to the active core cell 408, tab 410 need not be provided and the electronic component connects to the cover 412 and tab 406 as the battery terminals. If the cover 412 is an insulating material, both tabs 406 and 410 are provided to electrically connect to the electrical component.

Figure 5:
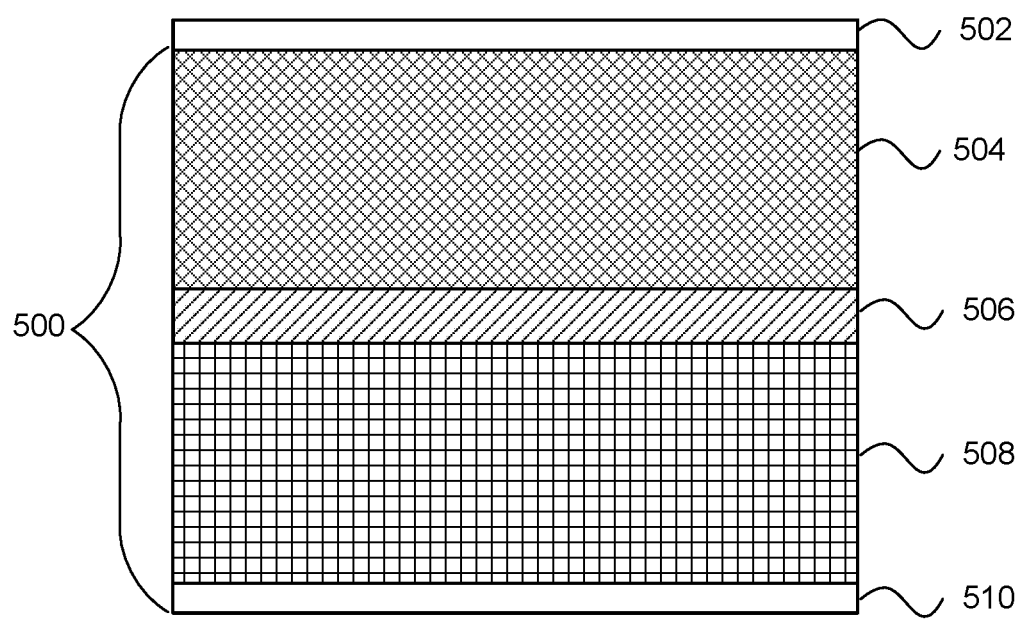
FIG. 5 illustrates a cross-section view of a battery cell of an electronic device according to some embodiments of the disclosed technology.

FIG. 5 shows an example of an active cell element 500 according to some embodiments of the disclosed technology. This active cell element 500 may be used in any of the embodiments discussed above. In the example of a metal foam core, the first current collector 502 may be the foam tendrils, with active material 504 coated onto the tendrils, followed by the separator 506 coated onto active material 504 and the second active material 508 inserted into to foam core between the coated tendrils. Tab 410 would be connected to the copper foam. The second current collector 510 may be, for example, the cavity lining 404 or the inner conductive tube 204. In the example of the pen 200, the same coated-foam configuration may be used, or the inner conductive tube 204 may be coated with an active material and a separator, with a second active material 208, completing the battery. In this latter case, the material 208 may have an uncoated metal foam deployed to help conduct electrons to the metal outer housing 202, or the metal foam may be absent.

One of the first active material 504 and the second active material 508 is a cathode material and the other an anode material. For example, if the battery cell is an alkaline battery, the first active material 504 may be a manganese oxide cathode and the second active material 508 may be a zinc anode. In this example, the separator 406 is an ion conducting separator.

In some embodiments, the second current collector 510 of the active cell may be a metal foam, such as copper, that has a porous structure that allows an electrolyte to transport ions and electrons to an inner portion of the metal foam. The metal foam 510, however, is not limited to copper. Any type of conductive metal foam may be used, such as, for example, a nickel metal foam. In these embodiments, one of the first active material and the second active material is a cathode material and the other an anode material.

Figure 6A:
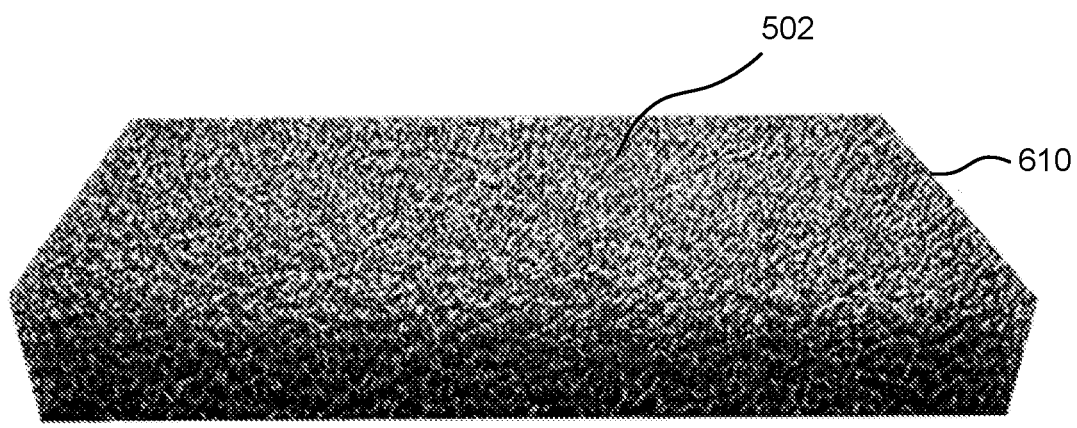
FIG. 6A is a perspective view of a copper foam according to some embodiments.
Figure 6B:
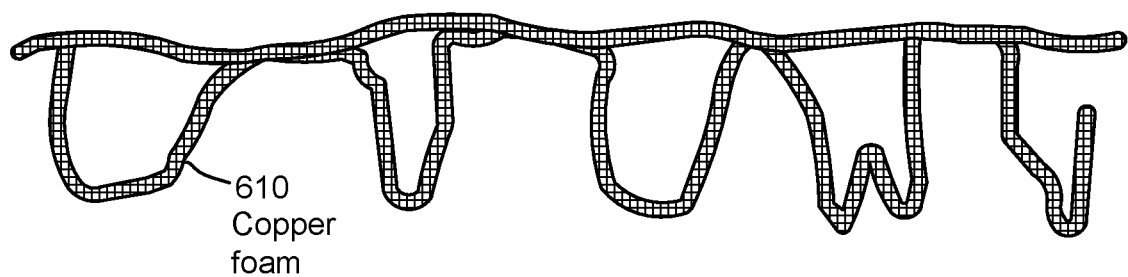
FIG. 6B is a simplified cross-section view of the copper foam of FIG. 6A.

FIGS. 6A-6D illustrate an example process of fabricating an active core cell, such as the active core cell 208 of FIGS. 2 and 3 and the active core cell 408 of FIG. 4. FIG. 6A is a perspective view of a metal foam 610 according to one embodiment. The metal foam 610 that serves as a second current collector has a porous structure permeating the bulk of the active materials. A tab (not shown), such as tab 410 shown in FIG. 4, can be attached to the metal foam 610 to extend the second current collector outside the battery to attach to an electronic device. FIG. 6B illustrates a simplified cross-section side view of the metal foam 610 according to one embodiment. FIG. 6B illustrates the various tendrils of the metal foam 610.

Figure 6C:
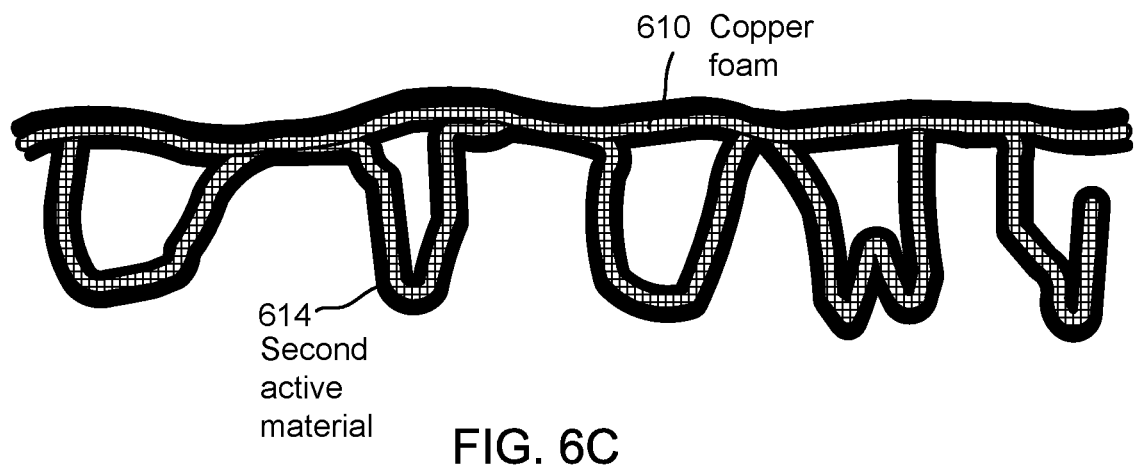
FIG. 6C is a simplified cross-section view of the copper foam of FIG. 6B coated with an active material.
Figure 6D:
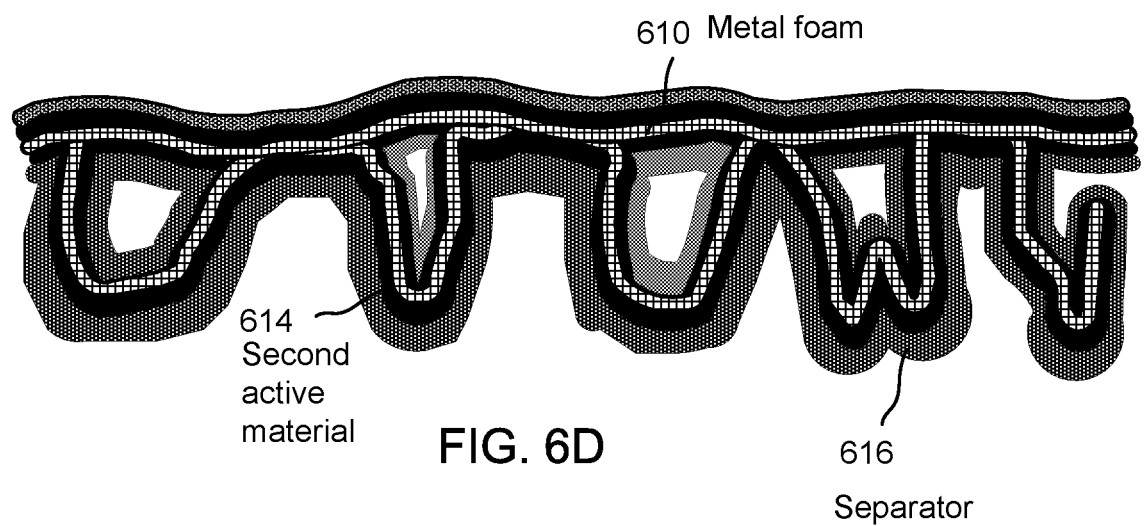
FIG. 6D is a simplified cross-section view of FIG. 6C with a separator coated on the active material.
Figure 6E:
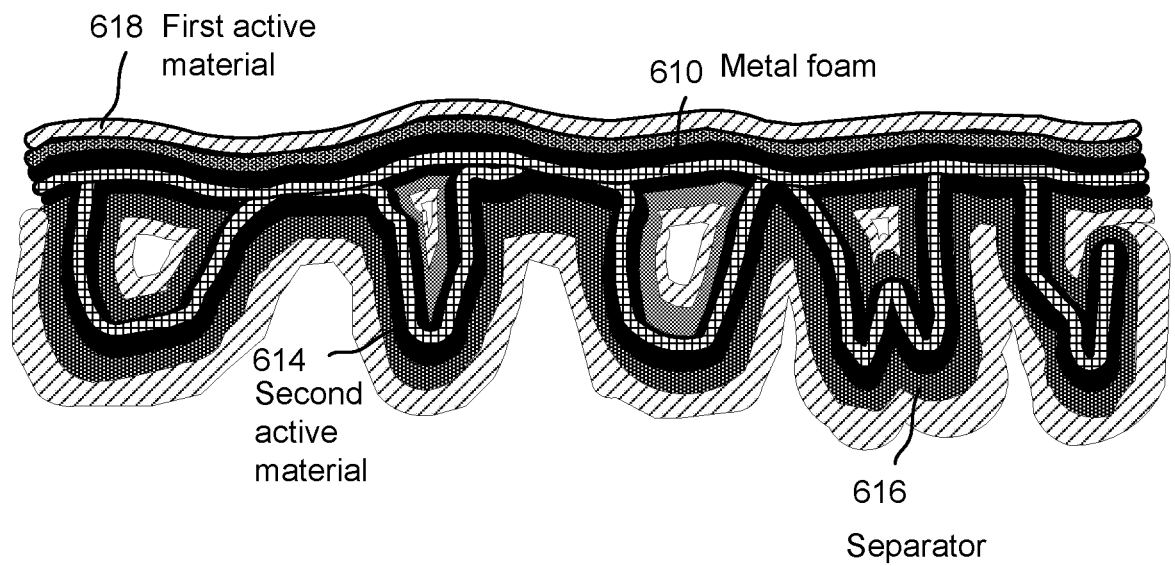
FIG. 6E is a simplified cross-section view of FIG. 6D with another active material coated on the separator.

As shown in FIG. 6C, a second active material 614 is coated on all sides of the metal foam 610. The second active material 614 is then coated on all sides with a polymer separator 616, as can be seen in FIG. 6D. As illustrated in FIG. 6E, the active cell core is completed by inserting a first active material 618 is inserted into the pores of the metal foam 610 to contact all of the separator 616. The first active material 618 is at least partially disposed in the pores, as shown in FIG. 6E, or may completely fill the pores of the metal foam 610.

A first current collector (not shown) is attached to the first active material 618. The first current collector may be, for example, the outer metallic housing 202 of the pen 200 or the conductive lining 404 of the cavity 402.

The metal foam 610 may comprise porous copper or sponge-shaped copper. While several example embodiments herein use copper (Cu) foam, the disclosed technology is not so limited. Indeed, any electrochemically stable metal foam or electrically conductive porous structure may be used in certain embodiments.

The battery cell shown in FIGS. 6A-6D can be used in any of the embodiments discussed above, such as the electronic pen 200 in FIGS. 2 and 3 and the electronic device shown in FIG. 4.

Example Embodiments

The following are examples of further embodiments. Examples may include subject matter such as a battery, device, method, means for performing acts of the method, or of at least one machine-readable medium including instructions that, when performed by a machine cause the machine to perform acts of the method according to the embodiments and examples described herein.

Example 1 is an electronic device, including an outer housing including an electrically conductive material, at least one electrical component, and a battery cell positioned in a cavity in the outer housing. The battery cell is integrated into the electronic device. The battery cell includes a first current collector, and an active cell core. The first current collector is the electrically conductive material of the outer housing of the electronic device and connects to the at least one electrical component. The active cell core includes a first active material in adjacent facing relation to and electrically coupled to the first current collector, a second active material, a separator positioned between the first active material and the second active material, and a second current collector electrically coupled with the second active material. The second current collector connects to the at least one electrical component.

Example 2 includes the electronic device of example 1, wherein one of the first active material and the second active material is a cathode material and the other of the first active material and the second active material is an anode material.

Example 3 includes the electronic device of example 2, wherein the second current collector comprises a metal foam comprising pores, wherein one of the first active material or the second active material is at least partially disposed in the pores.

Example 4 includes the electronic device of example 2, wherein the second current collector comprises a sponge-shaped copper, wherein one of the first active material or the second active material is at least partially disposed on the sponge-shaped copper.

Example 5 includes the electronic device of any of examples 1-4, wherein the electronic device is a pen, the electronic device further comprising an ink tube.

Example 6 includes the electronic device of example 5, further comprising a metal tube surrounding the ink tube, the metal tube electrically connected to the second current collector to connect to the at least one electrical component.

Example 7 includes the electronic device of any of examples 1-4, wherein the outer housing comprises a metal outer housing.

Example 8 includes the electronic device of any of examples 1-4, wherein the outer housing comprises a plastic housing and the electrically conductive material comprises a metal lining on at least a portion of the plastic housing.

Example 9 is a method of manufacturing an electronic device with an integrated battery. The method includes providing an outer housing that includes an electrically conductive material, at least one electrical component, positioning a battery cell in a cavity of an outer housing, and providing an outer housing that includes an electrically conductive material as a first current collector. The battery cell is integrated into the electronic device. The method also includes electrically connecting the electrically conductive material to the at least one electrical component, providing a first active material in adjacent facing relation to and electrically coupled to the electrically conductive material, providing a second active material, providing a separator positioned between the first active material and the second active material, providing a second current collector electrically coupled with the second active material, and electrically connecting the second current collector to the at least one electrical component.

Example 10 includes the method of example 9, wherein one of the first active material and the second active material is a cathode material and the other of the first active material and the second active material is an anode material.

Example 11 includes the method of example 10, wherein the second current collector comprises a metal foam comprising pores, wherein one of the first active material or the second active material is at least partially disposed in the pores.

Example 12 includes the method of example 10, wherein the second current collector comprises a sponge-shaped copper, wherein one of the first active material or the second active material is at least partially disposed on the sponge-shaped copper.

Example 13 includes the method of any of examples 9-12, wherein the electronic device is a pen, the method further comprising providing an ink tube.

Example 14 includes the method of example 13, further comprising providing a metal tube surrounding the ink tube; and electrically connecting the metal tube electrically connected to the second current collector to connect to the at least one electrical component.

Example 15 includes the method of any of examples 9-12, wherein the outer housing comprises a metal outer housing.

Example 16 includes the method of any of examples 9-12, wherein the outer housing comprises a plastic housing and the electrically conductive material comprises a metal lining on at least a portion of the plastic housing.

Example 17 is an electronic device including means for housing the electronic device, at least one electrical component, and a battery cell positioned in a cavity in the means for housing the electronic device, the battery cell integrated into the electronic device and including a first current collector, and an active cell core. The first current collector is the electrically conductive material and connects to the at least one electrical component. The active cell core includes a first active material in adjacent facing relation to and electrically coupled to the first current collector, a second active material, means for separating the first active material and the second active material, and a second current collector electrically coupled with the second active material. The second current collector connects to the at least one electrical component.

Example 18 includes the electronic device of example 17, wherein one of the first active material and the second active material is a cathode material and the other of the first active material and the second active material is an anode material.

Example 19 includes the electronic device of example 18, wherein the second current collector comprises a metal foam comprising pores, wherein one of the first active material or the second active material is at least partially disposed in the pores.

Example 20 includes the electronic device of example 18, wherein the second current collector comprises a sponge-shaped copper, wherein one of the first active material or the second active material is at least partially disposed on the sponge-shaped copper.

Example 21 includes the electronic device of any of examples 17-20, wherein the electronic device is a pen, the electronic device further comprising an ink tube.

Example 22 includes the electronic device of example 21, further comprising a metal tube surrounding the ink tube, the metal tube electrically connected to the second current collector to connect to the at least one electrical component.

Example 23 includes the electronic device of any of examples 17-20, wherein the housing means comprises a metal outer housing.

Example 24 includes the electronic device of any of examples 17-20, wherein the housing means comprises a plastic housing and the electrically conductive material comprises a metal lining on at least a portion of the plastic housing.

Example 25 is an electronic device. The electronic device includes a housing, at least one electrical component; and a battery cell positioned in a cavity of the housing. The battery cell includes a first current collector lining and affixed to a surface of the cavity, a first active material in electrical contact with the first current collector, a second active material, a separator positioned between the first active material and the second active material, and a second current collector electrically coupled with the second active material. The first current collector and the second current collector are connected to the at least one electrical component.

Example 26 includes the electronic device of example 25, wherein one of the first active material and the second active material is a cathode material and the other of the first active material and the second active material is an anode material.

Example 27 includes the electronic device of example 26, wherein the second current collector comprises a metal foam comprising pores, wherein one of the first active material or the second active material is at least partially disposed in the pores.

Example 28 includes the electronic device of example 26, wherein the second current collector comprises a sponge-shaped copper, wherein one of the first active material or the second active material is at least partially disposed on the sponge-shaped copper.

Example 29 includes the electronic device of examples 25-28, wherein the second current collector extends outside of the cavity.

Example 30 includes the electronic device of examples 25-28, wherein the first current collector extends outside of the cavity.

Example 31 includes the electronic device of examples 25-28, further comprising a cavity lid.

Example 32 includes the electronic device of example 31, wherein the cavity lid is a portion of the second current collector and connects to the at least one electrical component.

Example 33 includes the electronic device of example 31, wherein the cavity lid is an insulating material.

Example 34 includes the electronic device of example 31, wherein the cavity lid is a portion of the first current collector and connects to the electronic component.

Example 35 is a method of integrally forming a battery within an electronic device. The method includes providing an electrical component, lining and affixing a first current collector to a surface of a cavity, providing a first active material in electrical contact with the first current collector, providing a second active material, providing a separator between the first active material and the second active material, providing a second current collector on the second active material, and connecting the first current collector and the second current collector to the electrical component.

Example 36 includes the method of example 25, wherein one of the first active material and the second active material is a cathode material and the other of the first active material and the second active material is an anode material.

Example 37 includes the method of example 36, wherein the second current collector comprises a metal foam comprising pores, wherein one of the first active material or the second active material is at least partially disposed in the pores.

Example 38 includes the method of example 36, wherein the second current collector comprises a sponge-shaped metal, wherein one of the first active material or the second active material is at least partially disposed on the sponge-shaped metal.

Example 39 includes the method of examples 35-38, further comprising providing a cavity lid as a portion of the second current collector and connecting the cavity lid to the electrical component.

Example 40 includes the method of examples 35-38, further comprising providing a cavity lid as a portion of the first current collector and connecting the cavity lid to the electrical component.

Example 41 includes the method of examples 35-38, further comprising providing a portion of at least one of the first current collector and the second current collector that extends outside of the cavity.

Example 42 is an electronic device. The electronic device includes means for housing the electronic device, at least one electrical component, and a battery cell positioned in a cavity of the housing means. The battery cell includes a first current collector lining and affixed to a surface of the cavity, a first active material in electrical contact with the first current collector, a second active material, means for separating the first active material and the second active material, and a second current collector electrically coupled with the second active material. The first current collector and the second current collector are connected to the at least one electrical component.

Example 43 includes the electronic device of example 42, wherein one of the first active material and the second active material is a cathode material and the other of the first active material and the second active material is an anode material.

Example 44 includes the electronic device of example 43, wherein the second current collector comprises a metal foam comprising pores, wherein one of the first active material or the second active material is at least partially disposed in the pores.

Example 45 includes the electronic device of example 43, wherein the second current collector comprises a sponge-shaped copper, wherein one of the first active material or the second active material is at least partially disposed on the sponge-shaped copper.

Example 46 includes the electronic device of examples 42-45, wherein the second current collector extends outside of the cavity.

Example 47 includes the electronic device of examples 42-45, wherein the first current collector extends outside of the cavity.

Example 48 includes the electronic device of examples 42-45, further comprising a means for enclosing the cavity.

Example 49 includes the electronic device of example 48, wherein the means for enclosing the cavity is a portion of the second current collector and connects to the at least one electrical component.

Example 50 includes the electronic device of example 48, wherein the means for enclosing the cavity is an insulating material.

Example 51 includes the electronic device of example 48, wherein the means for enclosing the cavity is a portion of the first current collector and connects to the electronic component.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art. The scope of the present invention should, therefore, be determined only by the following claims.

The invention claimed is:

1. An electronic device, comprising:
   an outer housing including an electrically conductive material;
   at least one electrical component; and
   a battery cell positioned in a cavity in the outer housing, the battery cell integrated into the electronic device and including:
   a first current collector, wherein the first current collector is the electrically conductive material of the outer housing of the electronic device and connects to the at least one electrical component; and
   an active cell core including:
   a first active material in adjacent facing relation to and electrically coupled to the first current collector;
   a second active material;
   a separator positioned between the first active material and the second active material; and
   a second current collector electrically coupled with the second active material, wherein the second current collector connects to the at least one electrical component.

2. The electronic device of any of claim 1, wherein one of the first active material and the second active material is a cathode material and the other of the first active material and the second active material is an anode material.

3. The electronic device of claim 2, wherein the second current collector comprises a metal foam comprising pores, wherein one of the first active material or the second active material is at least partially disposed in the pores.

4. The electronic device of claim 2, wherein the second current collector comprises a sponge-shaped copper, wherein one of the first active material or the second active material is at least partially disposed on the sponge-shaped copper.

5. The electronic device of claim 1, wherein the electronic device is a pen, the electronic device further comprising an ink tube.

6. The electronic device of claim 5, further comprising a metal tube surrounding the ink tube, the metal tube electrically connected to the second current collector to connect to the at least one electrical component.

7. The electronic device of claim 1, wherein the outer housing comprises a metal outer housing.

8. The electronic device of claim 1, wherein the outer housing comprises a plastic housing and the electrically conductive material comprises a metal lining on at least a portion of the plastic housing.

9. An electronic device, comprising:
   a housing;
   at least one electrical component; and
   a battery cell positioned in a cavity of the housing, the battery cell including:
      a first current collector lining and affixed to a surface of the cavity, the first current collector connected to the at least one electrical component;
      a first active material in electrical contact with the first current collector;
      a second active material;
      a separator positioned between the first active material and the second active material; and
      a second current collector electrically coupled with the second active material, the second current collector connected to the at least one electrical component.

10. The electronic device of claim 9, wherein one of the first active material and the second active material is a cathode material and the other of the first active material and the second active material is an anode material.

11. The electronic device of claim 10, wherein the second current collector comprises a metal foam comprising pores, wherein one of the first active material or the second active material is at least partially disposed in the pores.

12. The electronic device of claim 10, wherein the second current collector comprises a sponge-shaped copper, wherein one of the first active material or the second active material is at least partially disposed on the sponge-shaped copper.

13. The electronic device of claim 10, wherein the second current collector extends outside of the cavity.

14. The electronic device of claim 10, wherein the first current collector extends outside of the cavity.

15. The electronic device of claim 10, further comprising a cavity lid.

16. The electronic device of claim 15, wherein the cavity lid is a portion of the second current collector and connects to the at least one electrical component.

17. The electronic device of claim 15, wherein the cavity lid is an insulating material.

18. The electronic device of claim 15, wherein the cavity lid is a portion of the first current collector and connects to the electronic component.

19. A method of integrally forming a battery within an electronic device, comprising:
   providing an electrical component;
   lining and affixing a first current collector to a surface of a cavity;
   providing a first active material in electrical contact with the first current collector;
   providing a second active material;
   providing a separator between the first active material and the second active material;
   providing a second current collector on the second active material; and
   connecting the first current collector and the second current collector to the electrical component.

20. The method of claim 19, wherein one of the first active material and the second active material is a cathode material and the other of the first active material and the second active material is an anode material.

21. The method of claim 20, wherein the second current collector comprises a metal foam comprising pores, wherein one of the first active material or the second active material is at least partially disposed in the pores.

22. The method of claim 20, wherein the second current collector comprises a sponge-shaped metal, wherein one of the first active material or the second active material is at least partially disposed on the sponge-shaped metal.

23. The method of claim 19, further comprising providing a cavity lid as a portion of the second current collector and connecting the cavity lid to the electrical component.

24. The method of claim 19, further comprising providing a cavity lid as a portion of the first current collector and connecting the cavity lid to the electrical component.

25. The method of claim 19, further comprising providing a portion of at least one of the first current collector and the second current collector that extends outside of the cavity.

* * * * *